United States Patent [19]

Tanizoe et al.

[11] Patent Number: 5,614,947
[45] Date of Patent: Mar. 25, 1997

[54] SOLID STATE IMAGING APPARATUS

[75] Inventors: Yukihiro Tanizoe, Neyagawa; Masayuki Yoneyama, Takatsuki; Yasutoshi Yamamoto, Hirakata; Shougo Sasaki, Kadoma, all of Japan

[73] Assignee: Matsushita Electric Industrial Co., Ltd., Osaka, Japan

[21] Appl. No.: 541,971

[22] Filed: Oct. 10, 1995

Related U.S. Application Data

[63] Continuation of Ser. No. 260,819, Jun. 16, 1994, abandoned.

[30] Foreign Application Priority Data

Jun. 16, 1993 [JP] Japan .................... 5-144605
Oct. 5, 1993 [JP] Japan .................... 5-249018

[51] Int. Cl.⁶ .................... H04N 5/217; H04N 5/21
[52] U.S. Cl. .................... 348/241; 348/237; 348/279; 348/609; 348/663; 358/454; 358/533
[58] Field of Search .................... 348/225, 230, 348/234, 235, 237, 259, 260, 266, 272, 279, 241, 615, 609, 663; 358/533, 454

[56] References Cited

U.S. PATENT DOCUMENTS

| | | | |
|---|---|---|---|
| 4,626,898 | 12/1986 | Baba et al. | 348/279 |
| 4,774,565 | 9/1988 | Freeman | 358/41 |
| 5,191,409 | 3/1993 | Hamaguchi | 348/272 |
| 5,253,046 | 10/1993 | Shiraishi | 348/237 |
| 5,262,849 | 11/1993 | Mimura et al. | 348/237 |
| 5,333,055 | 7/1994 | Murata | 348/239 |

FOREIGN PATENT DOCUMENTS

| | | | |
|---|---|---|---|
| 368614 | 5/1990 | European Pat. Off. | H04N 9/67 |
| 2-166988 | 2/1990 | Japan | H04N 9/07 |
| 5-300526 | 5/1993 | Japan | H04N 9/07 |

OTHER PUBLICATIONS

Parulski, K. et al; "A Digital Color CCD Imaging System Using custom VLSI Circuits", IEEE Trans. on Cons. Elect., vol. 35, No. 3, Aug. 1989 pp. 382–388.
Patent Abstracts of Japan, vol. 14, No. 433 (Sep. 17, 1990).
Chrominance Moire Reduction Using CCM (Correlative Coefficient Multiplying) Signal Interpolation in a Single-—Imager Color Video Camera (pp. 1153–1160).
Luminance Signal Processing for Single–chip CCD Color Video Cameras (pp. 210–216).

*Primary Examiner*—Leo Boudreau
*Assistant Examiner*—Bipin Shalwala
*Attorney, Agent, or Firm*—Fish & Richardson P.C.

[57] ABSTRACT

A solid state imaging apparatus includes two-dimensional frequency process which is applied to an output signal from each pixel of a progressive scan-type CCD. The CCD has an an arrangement of color separation filters without making carriers in the horizontal and vertical directions of the two-dimensional frequency to obtain chrominance signals with less moire in the horizontal and vertical directions of the two-dimensional frequency. A luminance signal with less moire in the horizontal and vertical directions of the two-dimensional frequency can be obtained by interpolating with the ratio of a chrominance signal with less moire.

7 Claims, 14 Drawing Sheets

| 52 | 53 | | | | 55 | |
|---|---|---|---|---|---|---|
| | 1 | 0 | 0 | 0 | 1 | 0 |
| 64 | 0 | 0 | ④ | 0 | 0 | 0 | 59 |
| | 1 | 0 | 0 | 0 | 1 | 0 |

| 56 64 | | 57 | 51 | | 59 | |
|---|---|---|---|---|---|---|
| | 0 | 0 | 2 | 0 | 0 | 0 |
| | 2 | 0 | ⓪ | 0 | 2 | 0 |
| | 0 | 0 | 2 | 0 | 0 | 0 |

| | 60 | 51 | | | 62 |
|---|---|---|---|---|---|
| 0 | 1 | 0 | 0 | 0 | 1 |
| 64 — 0 | 0 | ⓪ | 4 | 0 | 0 — 59 |
| 0 | 1 | 0 | 0 | 0 | 1 |

| 64 | | 51 | 65 | 59 | |
|---|---|---|---|---|---|
| 0 | 0 | 0 | 2 | 0 | 0 |
| 0 | 2 | ⓪ | 0 | 0 | 2 |
| 0 | 0 | 0 | 2 | 0 | 0 | — 67

| 0 | 0 | 0 | 1 | 0 | 0 |
| 0 | 2 | ⓪ | 0 | 0 | 0 |
| 0 | 0 | 0 | 1 | 0 | 0 |

Fig.5(g)

| 0 | 1 | 0 | 0 | 0 | 0 |
| 0 | 0 | ⓪ | 2 | 0 | 0 |
| 0 | 1 | 0 | 0 | 0 | 0 |

Fig.5(f)

| 0 | 0 | 1 | 0 | 0 | 0 |
| 2 | 0 | ⓪ | 0 | 0 | 0 |
| 0 | 0 | 1 | 0 | 0 | 0 |

Fig.5(e)

| 1 | 0 | 0 | 0 | 0 | 0 |
| 0 | 0 | ② | 0 | 0 | 0 |
| 1 | 0 | 0 | 0 | 0 | 0 |

Fig.5(i)

| 53 | | | | 55 | |
|---|---|---|---|---|---|
| 0 | 0 | 0 | 0 | 1 | 0 |
| 0 | 0 | ② | 0 | 0 | 0 |
| 0 | 0 | 0 | 0 | 1 | 0 |

| 56 64 | | 57 | 51 | | 59 |
|---|---|---|---|---|---|
| 0 | 0 | 1 | 0 | 0 | 0 |
| 0 | 0 | ⓪ | 0 | 2 | 0 |
| 0 | 0 | 1 | 0 | 0 | 0 |

| 64 | 60 | 51 | | | 62 |
|---|---|---|---|---|---|
| 0 | 0 | 0 | 0 | 0 | 1 |
| 0 | 0 | ⓪ | 2 | 0 | 0 |
| 0 | 0 | 0 | 0 | 0 | 1 |

| 64 | | 51 | 65 | 59 | |
|---|---|---|---|---|---|
| 0 | 0 | 0 | 1 | 0 | 0 |
| 0 | 0 | ⓪ | 0 | 0 | 2 |
| 0 | 0 | 0 | 1 | 0 | 0 |

| Mg | G |
|----|----|
| Ye | Cy |
| G | Mg |
| Ye | Cy |

SOLID STATE IMAGING APPARATUS

This application is a continuation of U.S. application Ser. No. 08/260,819, filed Jun. 16, 1994, now abandoned.

FIELD OF INVENTION

This invention relates to a solid state imaging apparatus. More specifically, this invention relates to a solid state imaging apparatus in which each pixel receives incident light through a color separation filter disposed on the front of the pixel of an imaging element such as a progressive scan-type charge coupled device (hereinafter abbreviated as CCD).

BACKGROUND OF THE INVENTION

There are two types of color cameras that use an imaging element in their image pick-up part: one is a multi-chip CCD which uses a plurality of image elements and the other is a single-chip CCD which uses a single imaging element. A the single-chip CCD camera has an arrangement of color separation filters which corresponds to pixels of the CCD. The arrangement is selected to have predetermined spectral characteristics. In the single-chip CCD, one pixel outputs only one signal, but a plurality of chrominance signals and a luminance signal corresponding to one pixel can be obtained by operating a plurality of signals from the adjacent plural pixels. Inevitably, the single-chip CCD causes a two-dimensional sampling frequency of each chrominance signal to become low, so that false signals or chrominance moires appear in the luminance signals or the chrominance signals due to a high-pass spectrum of an image.

Figure 11:
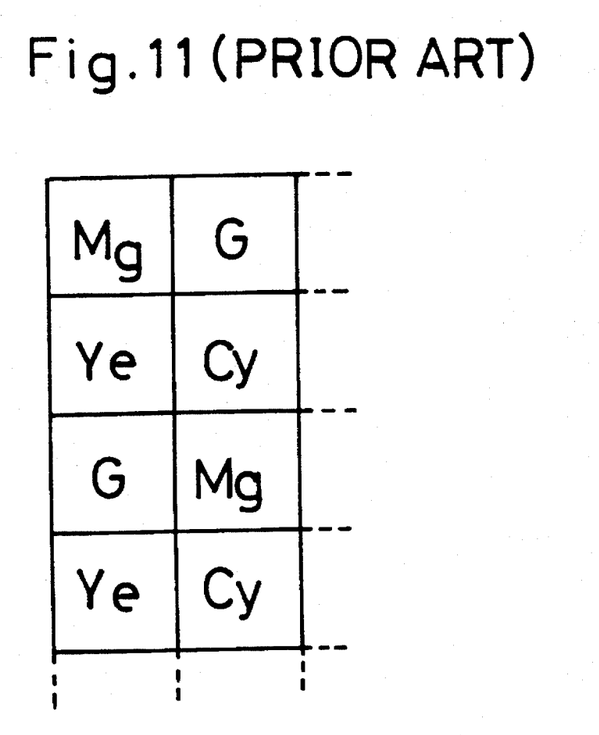
FIG. 11 is the drawing showing the arrangement of the conventional color separation filters.
Figure 13:
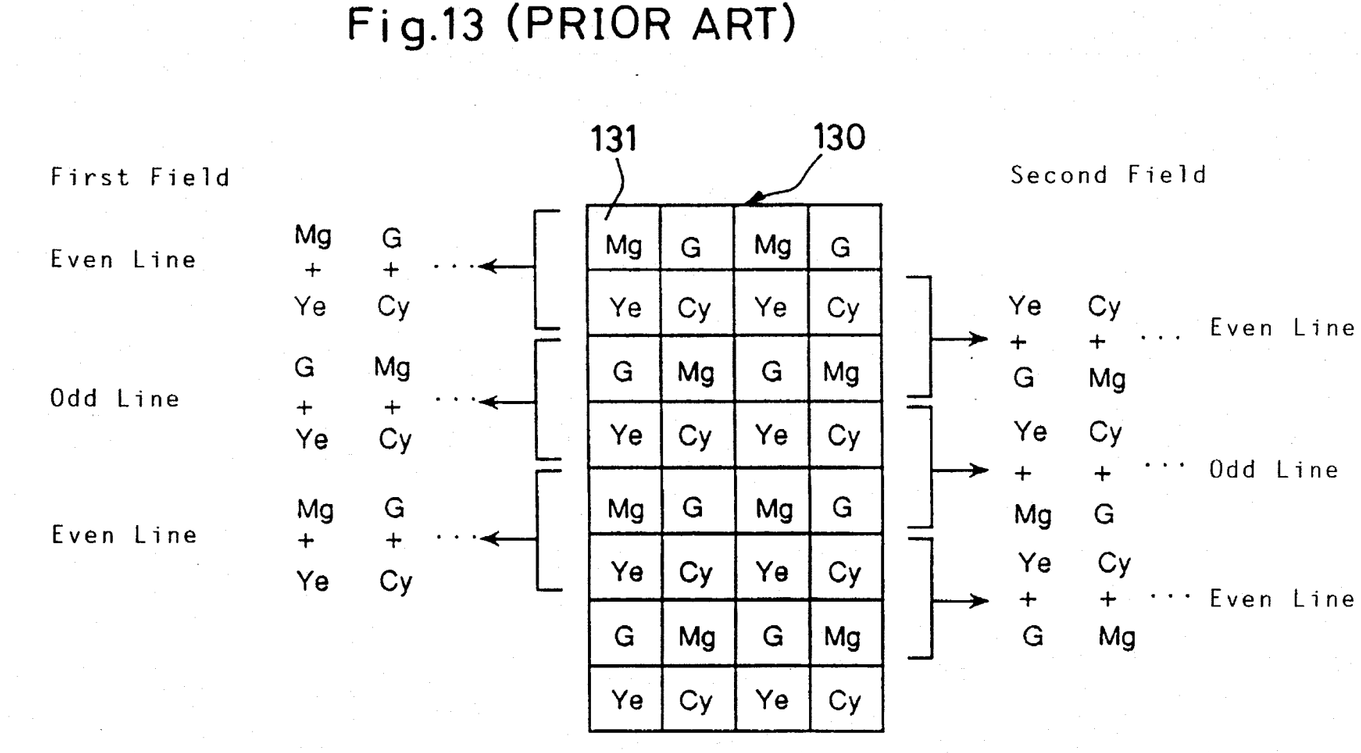
FIG. 13 is the drawing showing the signal output from the conventional image element.

A conventional imaging element uses a PD(Photodiode)-Mixing-System which sequentially reads two signals from two pixels on two lines that adjoin each other in the vertical direction simultaneously. The two signals are added. A sequential chrominance system is an example of the conventional pick-up system using the imaging element. FIG. 11 shows an arrangement of a minimum unit of color separation filters. Such a unit is repeatedly arrayed in the sequential chrominance system. FIG.13 shows a method for reading the signals from the pixels of the CCD according to the PD-Mixing-System. In FIG. 13, the numeral 130 shows the arrangement of the color separation filters and the letters of "Mg", "G", "Ye" and "Cy" in the boxes designate the spectral characteristics of the filters. For example, a filter 131 designated by "Mg" can pass only magenta colored light. On the other hand, the letters of "Mg", "G", "Ye" and "Cy" in both sides of the arrangement of the color separation filters 130 designate the output signals from the pixels designated by the same letters. In the PD-Mixing-System shown in FIG. 13, Ye(yellow)+Mg(magenta), Cy(cyanogen)+G(green) are serially output from even-number lines of the first field (left side of the color separation filters 130). Hereupon, Ye(yellow)=r(red)+g(green), M(magenta)=r(red)+b(blue) and Cy(cyanogen)=g(green)+b(blue). Thus, a signal $\{2r(red)-g(green)\}$ can be obtained by operating (Ye+Me)−(Cy+G). On odd lines, Cy+Mg and Ye+G are output point-sequentially, so that a signal $\{2b(blue)-g(green)\}$ can be obtained by operating (Cy+Mg)−(Ye+G). On the second field, Mg+Cy and G+Ye are output point-sequentially on even lines, so that a signal $(2b-g)$ can be obtained by operating (Mg+Cy)−(G+Ye). On odd lines, Mg+Ye and G+Cy are output point-sequentially. Therefore, a signal $(2r-g)$ can be obtained by operating (Mg+Ye)−(G+Cy).

In the sequential chrominance system mentioned above, color carriers exist in the horizontal direction of two-dimensional frequency, and a color separation is obtained through an operation of output signals from the pixels adjoined in the horizontal direction, that is, through an one-dimensional operation. As a result, a color moire appears in the horizontal direction of a picture. Furthermore, only one chrominance signal can be obtained from the output signals from the pixels arrayed on one horizontal line. Furthermore, a color moire appears in the vertical direction of two-dimensional frequency since a frequency of a two-dimensional sampling of R(red) and B(blue) lights is low in the vertical direction. However, the color moires in horizontal and vertical directions of two-dimensional frequency stand out more due to a visual characteristic of a human being. Thus, this is one of main causes of a poor picture quality. These moires are caused by the high-frequency spectrum of two-dimensional frequency of an incident picture. Therefore, they were reduced to some degree by using an optical low-pass filter such as a crystal optical filter in order to reduce the high-frequency spectrum of two-dimensional frequency. The reduction of the two-dimensional high-frequency spectrum of the incident picture by using the optical low-pass filter, however, was only possible up to a certain limit because this method was closely connected with poor resolution.

Figure 12:
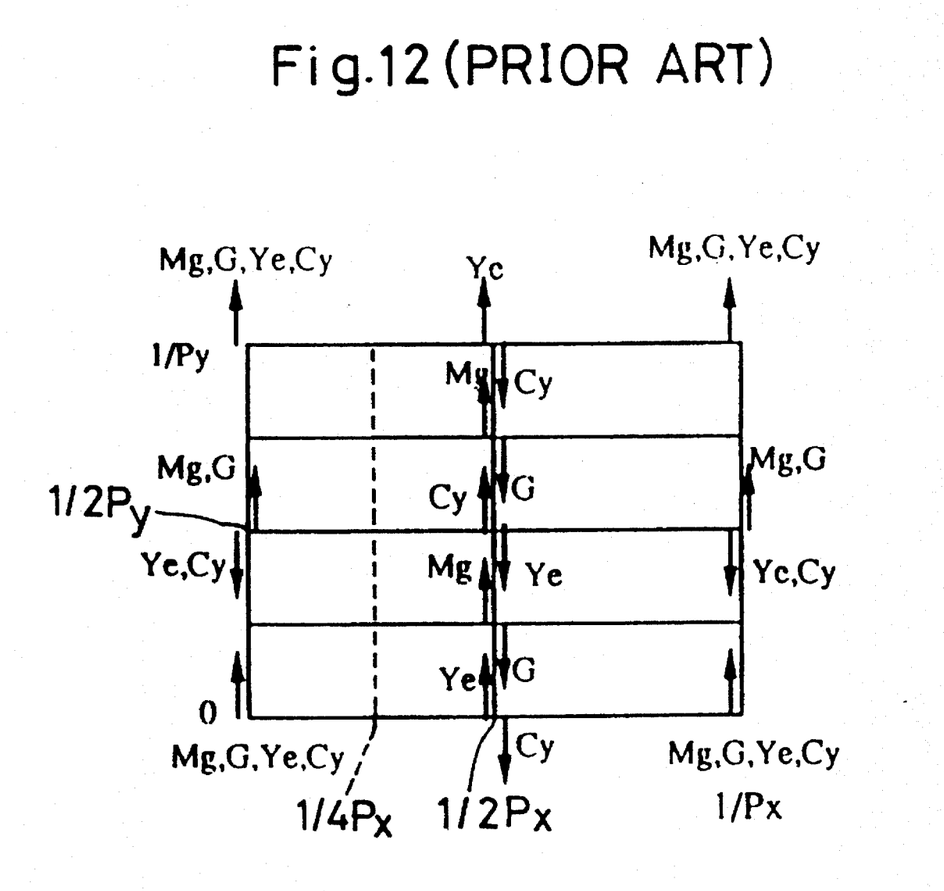
FIG. 12 is the drawing showing the carriers of the chrominance signals from the pixels of the CCD corresponding to Mg, G, Ye, Cy of the conventional color separation filters of FIG. 11.

FIG. 12 shows the above-mentioned carriers when the arrangement of the color separation filters shown in FIG. 11 is used. Px and Py indicate distances between two adjoined pixels, or the width of the pixels in the horizontal and vertical directions respectively. The abscissa of FIG. 12 shows the sampling frequency of specific chrominance signals in horizontal direction, and the ordinate of FIG. 12 shows the sampling frequency of the specific chrominance signals in the vertical direction. The carriers can be obtained by Fourier transformation of the sampling pattern of respective chrominance signals. The directions of the arrows in FIG. 12 designate the phases of the carriers. In view of the vertical line 1/2Px, the directions of arrows Ye and Cy or Mg and G are opposite to each other. Such differences of the directions of the carriers cause the appearance of the luminance moires in the horizontal direction, which causes poor resolution in the horizontal direction.

A luminance signal can be obtained by adding a plurality of chrominance signals from the adjoined pixels corresponding to several different color separation filters. It is known to minimize the luminance moire when an additive ratio of obtaining the luminance signal by adding each chrominance signal is determined to be the inverse of a sensitivity ratio of each chrominance signal. However, since the sensitivity of each chrominance signal depends on spectral characteristics of incident light, the additive ratio must also be changed according to the spectral characteristics of the incident light.

Generally, an image characteristically has strong color correlation in a localized picture area. A method to reduce the moires by applying this characteristic is described in Publication Gazette of Unexamined Japanese Patent Application Hei 2-166988 titled "Solid Color Camera" or described in Television Gakkaishi Vol.46, No. 9, pp. 1153–1160 (1992) etc.

This system is briefly explained in the following. For example, when the sequential chrominance system using the PD-Mixing image element and the color separation filters shown in FIG. 11 is applied, either chrominance signals, Mg+Ye and G+Cy or Mg+Cy and G+Ye, are output sequentially. If there is no color change (monochromatic and even), a ratio of Mg+Ye:G+Cy:Mg+Cy:G+Ye is constant. Thus, on a line outputting Mg+Ye and G+Cy, G+Cy is interpolated by an operation $(G+Cy)'=(G+Cy)_L/(Mg+Ye)_L \times (Mg+Ye)$ against a position of pixel which outputs Mg+Ye, and Mg+Ye is interpolated by an operation $(Mg+Ye)'=(Mg+Ye)_L/(G+Cy)_L \times (G+Cy)$ against a position of pixel which outputs G+Cy. $(Mg+Ye)_L$ and $(G+Cy)_L$ are low-pass spectrums of Mg+Ye and G+Cy, respectively, which are obtained by passing signals Mg+Ye and G+Cy through a low-pass-filter. In other words, the luminance moire is reduced by the interpolation operation according to the ratio of chrominance signals in which a color moire was reduced by the low-pass-filter.

When using the arrangement of the color separation filter shown in FIG. 11 which renders the color carriers shown in FIG. 12 in the horizontal direction, the low-pass filter for reducing the color moire must have a zero point on a vertical line of 1/4Px in FIG. 12. In order to reduce the moires in the vicinity of the vertical line of 1/2Px in FIG. 12, it is necessary to use a narrow-band low-pass filter. However, while the interpolation operation is conducted as mentioned above, if an object shows a point of drastic color change, false signals appear because of an error between the color signal having a limited band and an actual color. The narrower the band of the low pass filter, the greater the error at the color boundary. Thus, the problem of false signals occurring from this error develops in a broad range, and therefore, it is difficult to reduce the luminance moire in the vicinity of the vertical line of 1/2Px.

SUMMARY OF THE INVENTION

The present invention solves the above-mentioned problems of the conventional solid state imaging apparatus and provides an improved solid state imaging apparatus which reduces chrominance moire and luminance moire in the horizontal and vertical directions caused by two-dimensional frequency.

A solid state imaging apparatus in accordance with the present invention comprises:

a progressive scan-type imaging element having a plurality of pixels arranged in vertical and horizontal directions;

an arrangement of color separation filters having repetition of a minimum unit of color separation filters arranged in a predetermined manner;

means for reading output signals from a plurality of pixels which are positioned in a predetermined area adjoined each other;

means for operating a plurality of chrominance signals corresponding to a position of a pixel by using a plurality of the signals from the predetermined adjoined pixels; and means for operating a luminance signal of the position by interpolation process of the chrominance signals responding to ratios of the chrominance signals.

In the solid state imaging apparatus configured above, it is preferable that a low-pass-filter having an arrangement of tap coefficients corresponding to the pixels of the imaging element is used for operating the chrominance signals, and the tap coefficients are multiplied by the output signals from the corresponding pixels.

Furthermore, it is preferable that output signals from the pixels on a plurality of horizontal lines adjoined in the vertical direction are used for operating the chrominance signals corresponding to the positions of the pixels on one horizontal line.

Furthermore, it is preferable to comprise a color boundary detection means for detecting a color boundary of two different colors, and that the tap coefficients of the low-pass-filter can be changed by responding to the detection signal of the color boundary detection means.

Furthermore, it is preferable that predetermined values are added to output signals from the pixels corresponding to a predetermined color separation filters in the means for operating the luminance signal.

Furthermore, it is preferable that the predetermined values which are added to output signals are selected to be in the same ratios as the output signals corresponding to the predetermined color separation filters when a white and even luminance object is imaged.

Furthermore, it is preferable that the predetermined values which are added to the output signals have a common value.

Furthermore, it is preferable that: the minimum unit of color separation filters is comprised of two horizontal pixels by four vertical pixels so that in the arrangement of the color separation filters, the top horizontal line is comprised of the repetition of white and green filters, the second horizontal line is comprised of the repetition of yellow and cyanogen filters, the third horizontal line is comprised of the repetition of green and white filters, and the fourth horizontal line is comprised of the repetition of cyanogen and yellow filters.

In the solid state imaging apparatus described above, a process of two-dimensional frequency characteristics is applied to an output signal from each pixel of a progressive scan-type CCD having an arrangement of color separation filters without making carriers in the horizontal and vertical directions of two-dimensional frequency. As a result, chrominance signals with less moire in the horizontal and vertical directions of two-dimensional frequency are obtained. A luminance signal with less moire in the horizontal and vertical directions of two-dimensional frequency can be obtained by an interpolation operation with a ratio of a chrominance signal with less moire.

DESCRIPTION OF PREFERRED EMBODIMENTS

A preferred embodiment of a solid state imaging apparatus of the present invention is specifically described by referring to the drawings.

Figure 1:
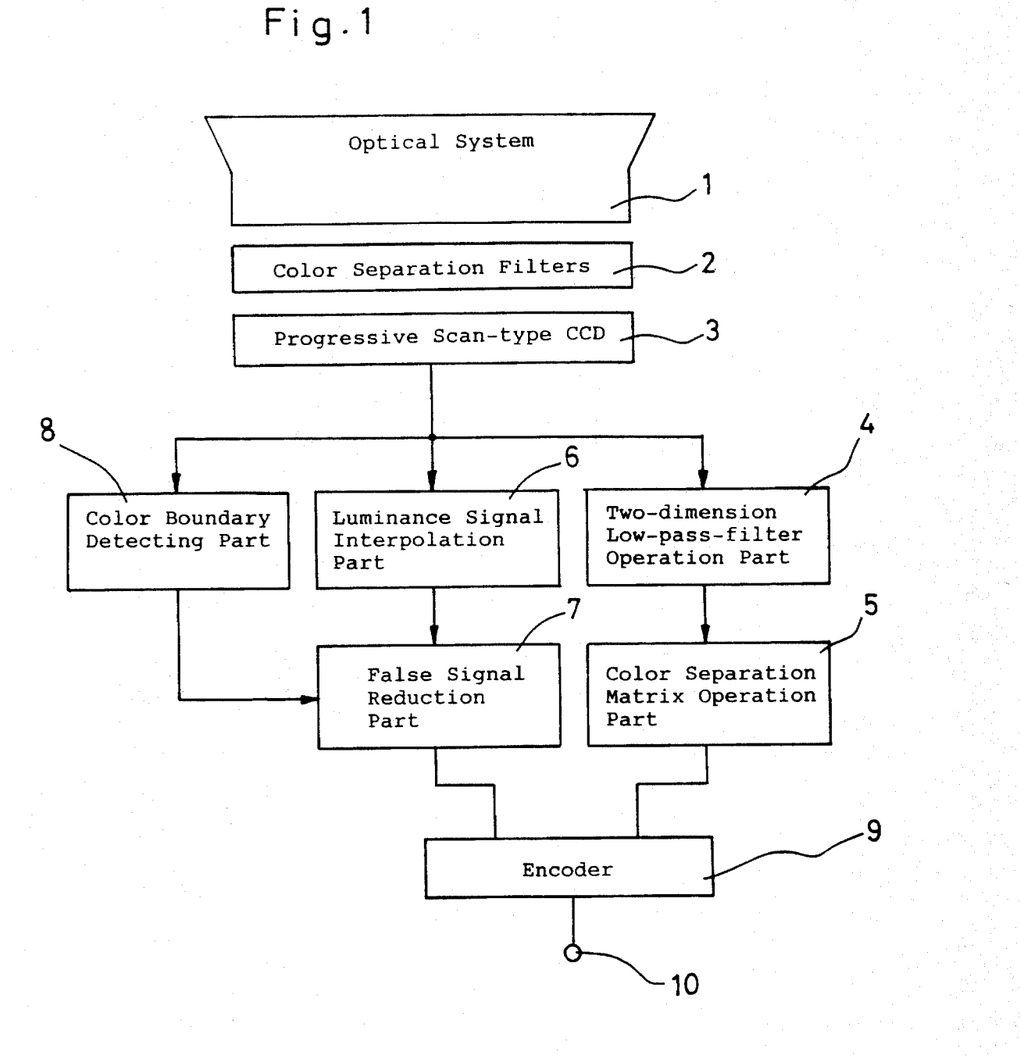
FIG. 1 is a block diagram showing a preferred embodiment of a solid state imaging apparatus of the present invention.
Figure 2:
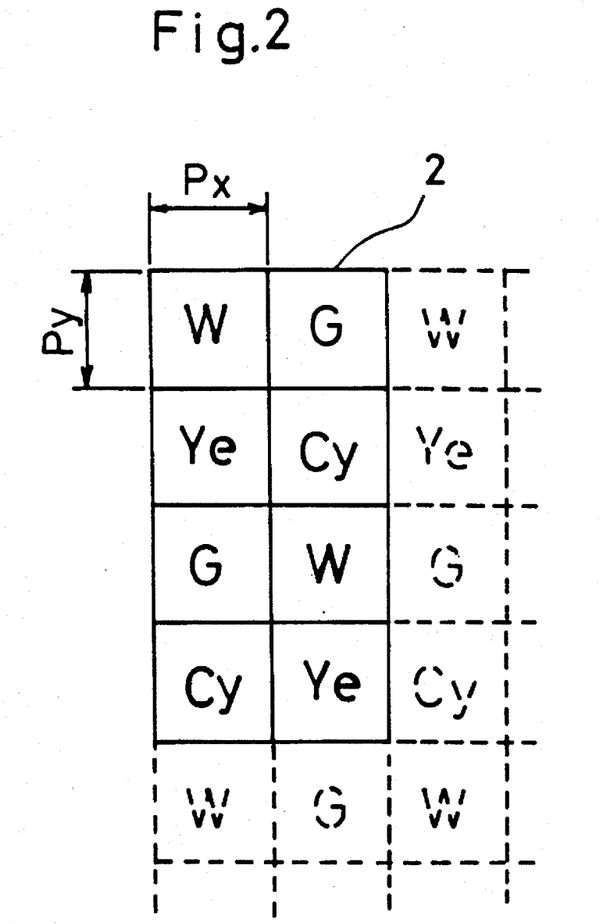
FIG. 2 is a plan view showing an arrangement of color separation filters of FIG. 1.
Figure 3:
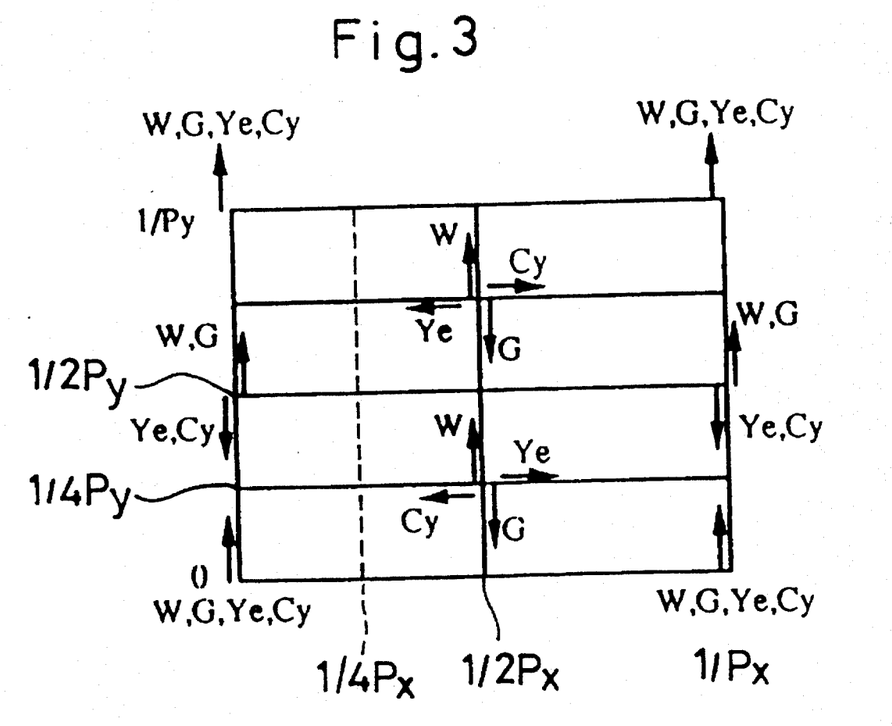
FIG. 3 is a drawing showing the two-dimensional sampling carriers of chrominance signals from pixels of a CCD corresponding to W, G, Ye and Cy of the color separation filters of FIG. 2.

FIG. 1 is a block diagram showing the preferred embodiment of the solid state imaging apparatus of the present invention. FIG. 2 shows a preferred configuration of an arrangement of color separation filters used for a solid state imaging element such as a progressive scan-type CCD. As shown in FIG. 2, the minimum unit of the arrangement of the color separation filters is comprised of 4×2 filters. FIG. 3 shows the carriers when tile arrangement of the color separation filters shown in FIG. 2 is used. In FIG. 3, Px and Py indicate distances between adjoined two pixels, or the width of the pixels in the horizontal and vertical directions respectively. The abscissa of FIG. 3 shows the sampling frequency of the color separation filters in the horizontal direction, and the ordinate of FIG. 3 shows the sampling frequency of the filters in the vertical direction. The carriers can be obtained by Fourier transformation of the sampling pattern of respective color signals. The directions of the arrows in FIG. 3 designate the phases of the carriers.

As shown in FIG. 1, the solid state imaging apparatus comprises an optical system 1 having a lens and so on, color separation filters 2, a progressive scan-type CCD 3, a two-dimensional low-pass-filtering operation part 4, a color separation matrix operation part 5, a luminance signal interpolation operation part 6, a false signal reduction part 7, a color boundary detecting part 8 and an encoder 9. The the solid state imaging apparatus of the present invention does not use the conventional PD-Mixing-System. Output signals from the pixels of the CCD 3 are directly output and not added together. Furthermore, the arrangement of the color separation filters 2 shown in FIG. 2 uses the white filters instead of the magenta filters. As shown in FIG. 2, the top line of the arrangement of the color separation filters 2 is comprised of the repetition of white and green filters. The second line of the arrangement of the filters 2 is comprised of the repetition of yellow and cyanogen filters. The third line of the arrangement of the filters 2 is comprised of the repetition of green and white filters. The fourth line of tile arrangement of the filters 2 is comprised of the repetition of cyanogen and yellow filters.

Figure 4:
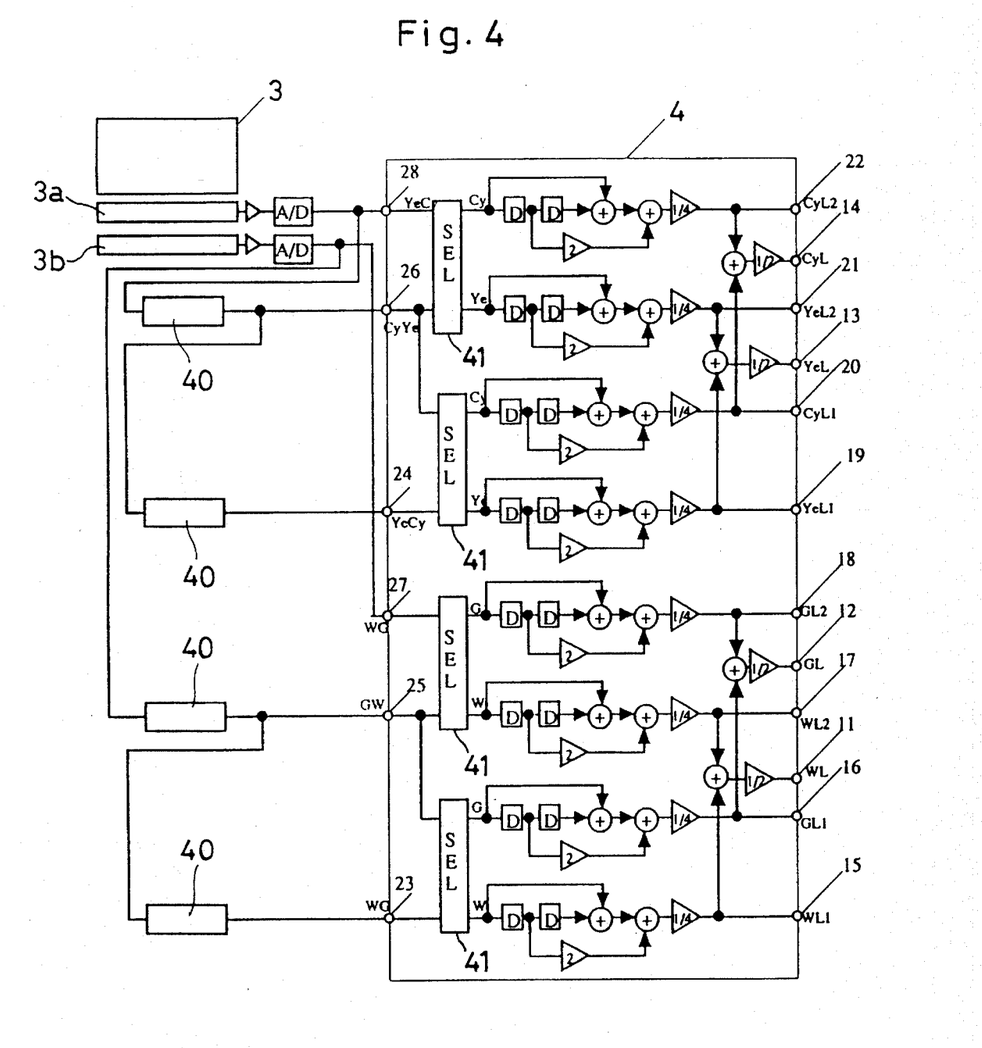
FIG. 4 is a block diagram of two-dimensional low-pass-filtering operation part of FIG. 1.

The function of the two-dimensional low-pass-filtering operation part 4 is described referring to FIG. 4. FIG. 4 shows one configuration of the two-dimensional low-pass-filtering operation part 4. Signals from the pixels on two lines 3a, 3b can be read simultaneously from the progressive scan-type CCD 3. For example, when the line corresponds to the top line in FIG. 2, the output signals from the line 3a are repetition of the W(white) chrominance signal and G(green) chrominance signal. The output signals move through four units of delay circuits 40 after passing through an A/D conversion process. Accordingly, signals for six lines can be input into selectors 41 through terminals 23 to 28 simultaneously. The selectors 41 separate the input signals into chrominance signals corresponding to W, G, Ye and Cy.

The separated signals are output after passing through the two-dimensional low-pass-filtering operation. The two-dimensional low-pass-filtering operation is described referring to FIGS. 5(a) to 5(l). In FIGS. 5(a) to 5(l), a position of a pixel 51 which is to be processed is circled.

Figure 5A:
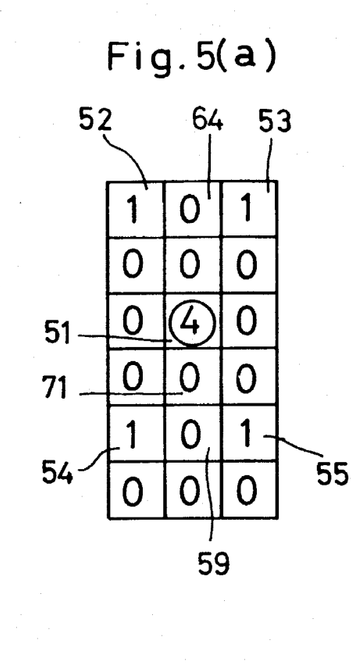
FIGS. 5(a) to 5(l) are drawings showing the tap coefficients of the two-dimensional low-pass-filter of FIG. 4.
Figure 5B:
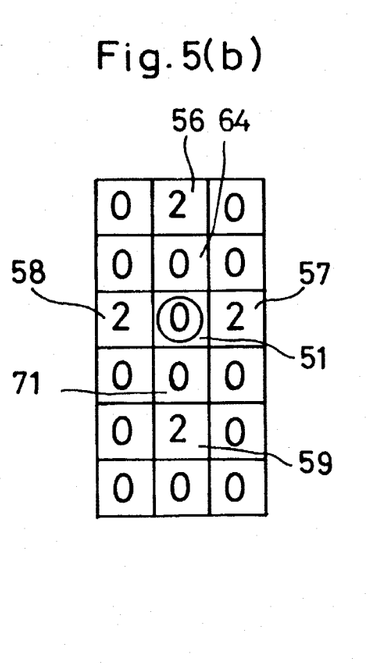
Figure 5C:
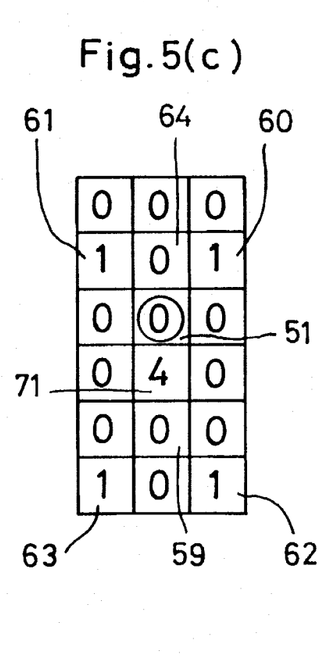
Figure 5D:
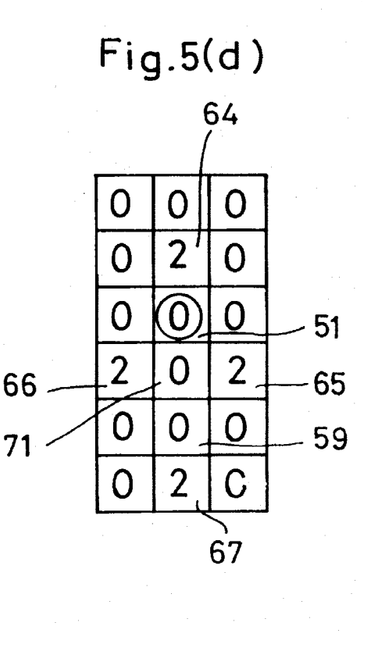
Figure 5E:
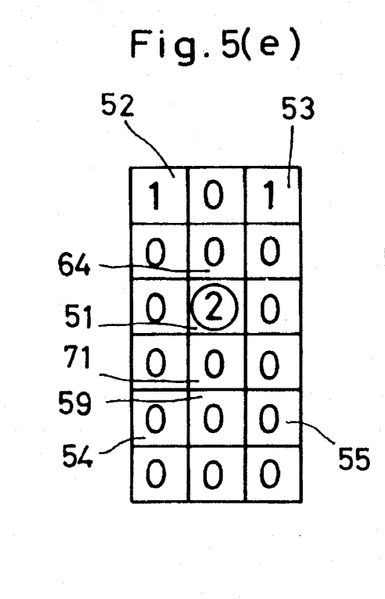
Figure 5F:
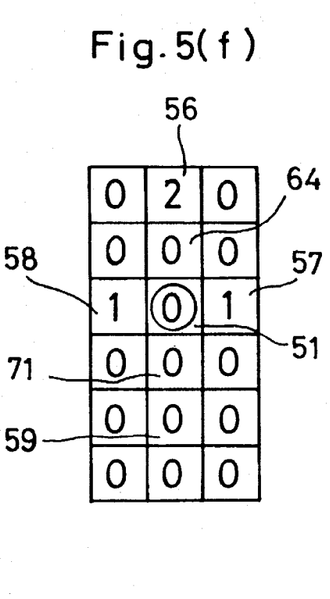
Figure 5G:
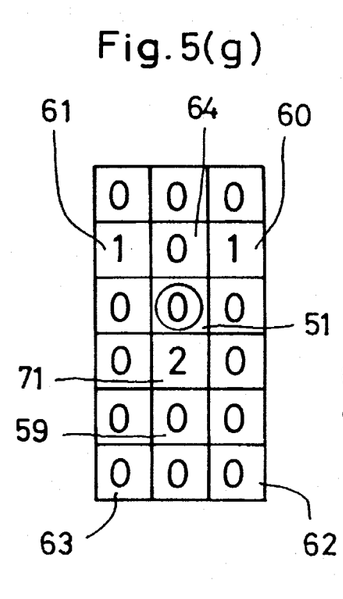
Figure 5H:
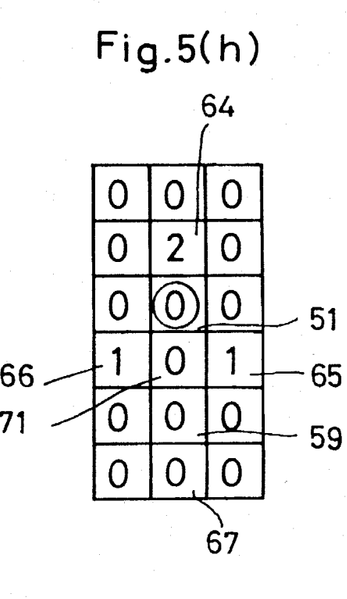
Figure 5I:
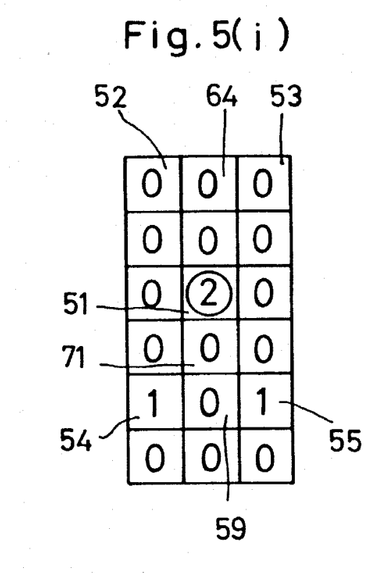
Figure 5J:
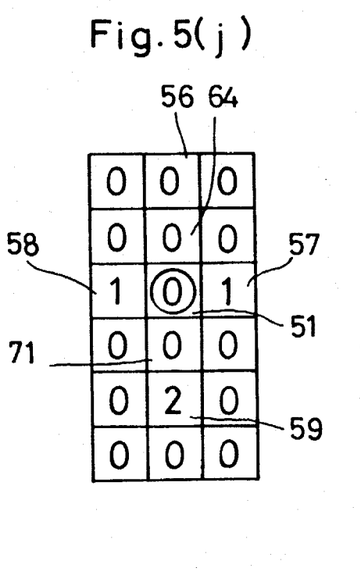
Figure 5K:
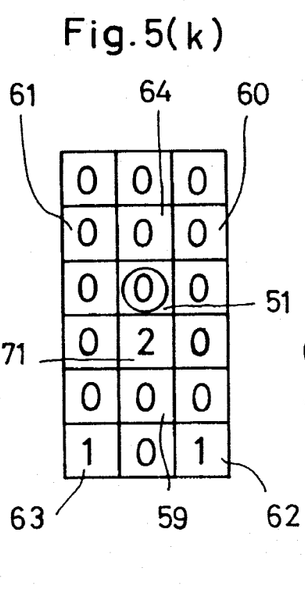
Figure 5L:
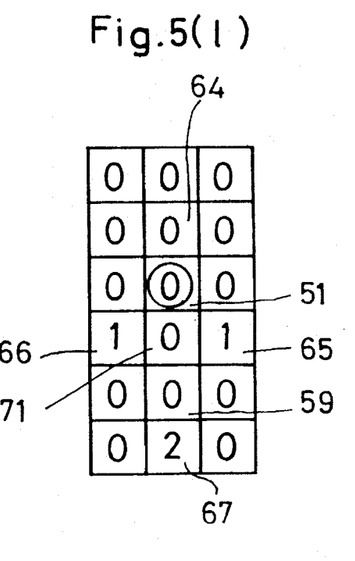

In this process, the series of signals on six lines are used for processing one line. For example, a W(white) signal at a position of the pixel 51 in FIG. 5(a) is processed by using the W signals from pixels 51 to 55. The numeral in each pixel corresponds to the tap coefficient to be multiplied. In FIG. 5(b), a G(green) signal at the position of the pixel 51 is processed by using the G signals from pixels 56 to 59. In FIG. 5(c), a Ye(yellow) signal at the position of another pixel 71 which is just below the pixel 51 in the vertical direction is processed by using the Ye signals from pixels 60 to 63. In FIG. 5(d), a Cy(cyanogen) signal at the position of the pixel 71 is processed by using the Cy signals from pixels 64 to 67. In FIG. 5(e), a W(white) signal at still another position of a pixel 64 which is just above the pixel 51 in the vertical direction is processed by using the W signals from pixels 51 to 55. In FIG. 5(f), a G(green) signal at the position of the pixel 64 is processed by using the G signals from pixels 56 to 59. In FIG. 5(g), a Ye(yellow) signal at the position of the pixel 51 is processed by using the Ye signals from pixels 60 to 63. In FIG. 5(h), a Cy(cyanogen) signal at the position of tile pixel 51 is processed by using the Cy signals from pixels 64 to 67. In FIG. 5(i), a W(white) signal at the position of the pixel 71 is processed by using the W signals from pixels 51 to 55. In FIG. 5(j), a G(green) signal at the position of the pixel 71 is processed by using the G signals from pixels 56 to 59. In FIG. 5(k), a Ye(yellow) signal at the position of still another pixel 59 which is two lines below the pixel 51 in the vertical direction is processed by using the Ye signals from pixels 60 to 63. In FIG. 5(l), a Cy(cyanogen) signal at the position of the pixel 59 is processed by using the Cy signals from pixels 64 to 67. As a result, all of the W, G, Ye and Cy signals at the same position of the pixel 51 can be obtained by using the low-pass-filters shown in FIGS. 5(a), 5(b), 5(g) and 5(f). The W, G, Ye and Cy signals at the position of the pixel 51 are used for obtaining chrominance signals, r, g and b, since these signals have the same timing delay in the horizontal and vertical directions. As a result, outputs from the circuits shown in FIG. 4 are processed by a two-dimensional low-pass-filter having the tap coefficients shown in FIGS. 5(a) to 5(l).

Generally, interpolation processes are applied to the pixel 51 and the pixel 71 which is just below the pixel 51 by following to formula (1) and (2) which are described below. The signals obtained by using the low-pass-filters shown in FIGS. 5(a) and 5(b) are used for interpolating the chrominance signals corresponding to the processed pixel 51. The signals obtained by using the low-pass-filters shown in FIGS. 5(c) and 5(d) are used for interpolating the chrominance signals corresponding to the pixel 71. Furthermore, the signals obtained by using the low-pass-filters shown in FIGS. 5(e) to 5(l) are used for detecting the change of colors at the positions of the pixels 64 and 59 which are adjacent to the interpolated pixels 51 and 71.

Each low-pass-filter shown in FIGS. 5(a) to 5(l) has a zero point in a two-dimensional frequency (1/2Px, 0),(0, 1/4Py). Signals of W, G, Ye, Cy which are output from circuits 11 to 22 in FIG. 4 may not be caused of moires against the two-dimensional frequency (1/2Px, 0), (0, 1/4Py) of the object. Among the signals, W, G, Ye and Cy, obtained in this manner, signals in which group delays conform in the vertical direction, i.e. signals of W, G, Ye and Cy obtained from output terminals 11, 12, 19 and 21 of the circuits in FIG. 4, are input into a color separation matrix operation part 5. The input signals are output after being processed according to predetermined chrominance signals such as R, G and B. The chrominance signals obtained in tills manner are not in danger of moires against the two-dimensional frequency (1/2Px, 0), (0, 1/4Py) of the object. The chrominance signals are explained above.

Figure 6:
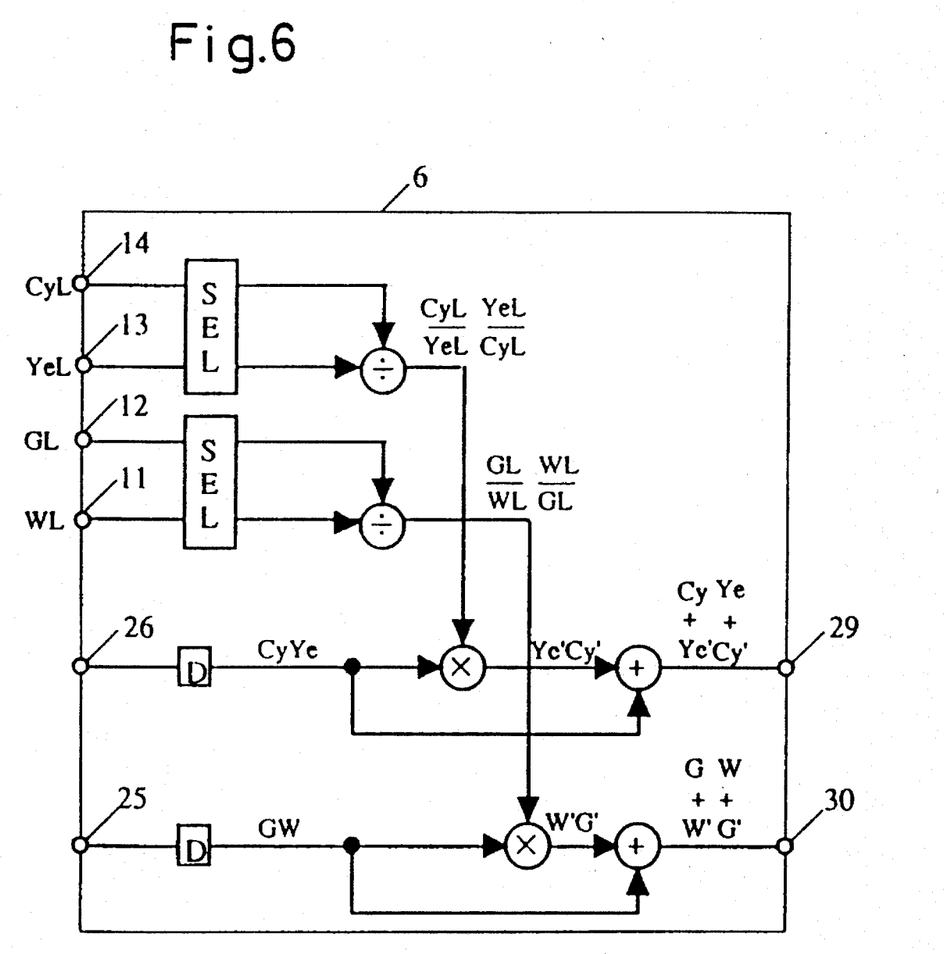
FIG. 6 is a block diagram showing one configuration of a luminance signal interpolation operation part of FIG. 1.

A description of the luminance signal follows. As described above, output signals of the progressive scan-type CCD 3 pass through the A/D conversion process, proceed to the memory comprised of four delay circuits 40, and finally appear simultaneously as signals for six lines at the terminals 23 to 28. The signals are input into the luminance signal interpolation operation part 6. FIG. 6 shows one configuration of the luminance signal interpolation operation part 6. Assuming that the signals of W, G, Ye and Cy which were output from the terminals 11, 12, 13 and 14 after being interpolated in the two-dimensional low-pass-filtering operation in the circuits of FIG. 4, are described as $W_L$, $G_L$, $Ye_L$ and $Cy_L$. The following operations are conducted by using $W_L$, $G_L$, $Ye_L$ and $Cy_L$ in the circuits of FIG. 6 to interpolate G', W', Ye' and Cy' in positions of W, G, Ye, Cy in the arrangement of the color separation filter:

$$W'=W_L/G_L \times G$$

$$G'=G_L/W_L \times W$$

$$Ye'=Ye_L/Cy_L \times Cy$$

$$Cy'=Cy_L/Ye_L \times Ye \qquad (1).$$

In the arrangement of the color separation filter according to FIG. 2, the W-signal and G-signal or the Ye-signal and Cy-signal will gather against each pixel by the above-mentioned interpolation operation. By setting W+G=Ye+Cy=r+2g+b as a luminance signal, it is possible to obtain a luminance signal having less tendency of moire in the horizontal and vertical directions, but having high resolution. In the interpolation operation above, since the two-dimensional low-pass-filter for obtaining $W_L$, $G_L$, $Ye_L$ and $Cy_L$ is designed to have a zero point in a vertical line of 1/2pX in the two-dimensional frequency (1/2Px, 0), the moire in the vicinity of the two-dimensional frequency (1/2Px, 0) can be reduced by applying a wide-band low pass filter in the horizontal direction. The reduction of moire in the present invention is much greater than by using the conventional arrangement of the color separation filter shown in FIG. 11. As a result, the false signal of the interpolation operation at a color boundary (color changing point) appears in a narrower range in the present invention than by the color separation filter shown in FIG. 11.

Figure 7:
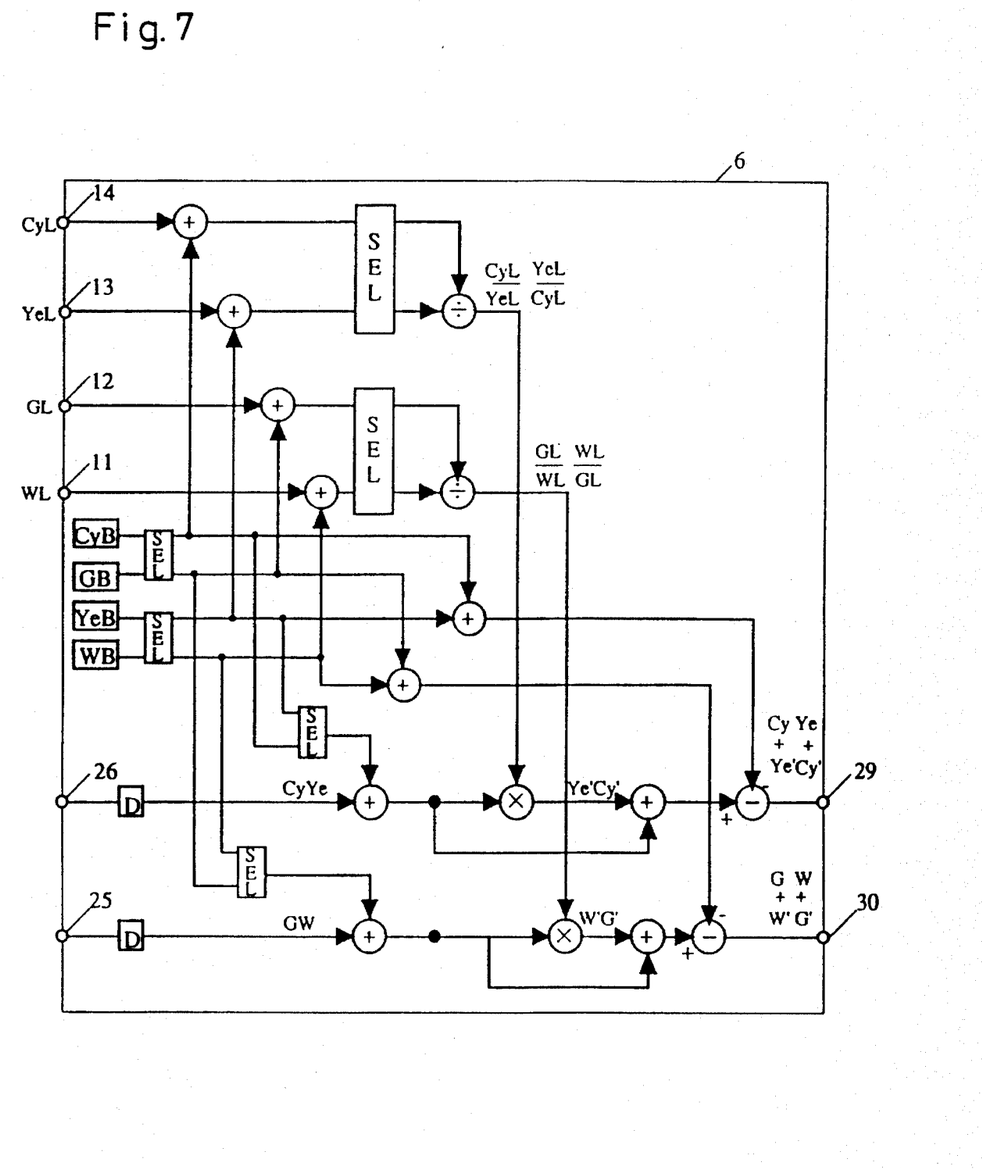
FIG. 7 is a block diagram showing another configuration of a luminance signal interpolation operation part of FIG. 1.

As mentioned above, the false signal appears at the color boundary in the interpolation operation according to the above-mentioned formula (1). More specifically, when the ratio of the low-pass color signal in formula (1), i.e. the fluctuation of $W_L$:$G_L$ or $Ye_L$:$Cy_L$ is large, a large false signal may be produced. FIG. 7 shows a second configuration of the luminance signal interpolation part. The luminance signal interpolation part 6 adds a constant amount to each color at an each pixel signal. The following formulas show the interpolation operations in the block diagram of FIG. 7.

$$W'+WB=(W_L+WB)/(G_L+GB) \times (G+GB)$$

$$G'+GB=(G_L+WB)/(W_L+WB) \times (W+WB)$$

$$Ye'+YeB=(Ye_L+YeB)/(Cy_L+CyB) \times (Cy+CyB)$$

$$Cy'+CyB=(Cy_L+CyB)/(Ye_L+YeB) \times (Ye+YeB) \qquad (2)$$

WB, GB, YeB and CyB are constants in this case. For example, when picking up an image of a white object having a constant luminance level in a certain color temperature, W:G:Ye:Cy should be determined so that their amounts become equal to WB:GB:YeB:CyB. By adding the constants, a fluctuation of $(W_L+WB):(G_L+GB)$ or $(Ye_L+YeB):(Cy_L+CyB)$ at a color boundary will be reduced, more specifically, a false signal of large scale can be prevented. When the amounts of WB, GB, YeB and CyB are set larger, the false signal at the color boundary will be reduced more, however, the effective of moire reduction in a part without a color change tends to be reduced.

An assumption in the interpolation operation of formula (1) is that a rapid color change will not take place, so that the ratio between a low-pass frequency spectrum in each of signals of W, G, Ye and Cy, and an amplitude of a high frequency spectrum is equal. However, when a chromatic aberration of a lens is large, or when an optical low-pass filter for color selection, for example, shown in Publication Gazette of Unexamined Japanese Patent Application Hei 4-9915 is used, it is possible that only the r(red) and b(blue) spectrums among the high frequency spectrums of a spatial frequency which are included in an incident light into the solid state imaging element are reduced. In this case, the ratios between the amplitude of the high- frequency spectrum and that of the low-pass frequency spectrum become unequal. Therefore, moire cannot be reduced by the interpolation operation of formula (1). Assuming that the output signals, W, G, Ye and Cy using a color separation filter are as follows:

$$W=r+g+b$$

$$G=g$$

$$Ye=r+g$$

$$Cy=g+b \qquad (3).$$

Each of the four signals includes a spectrum corresponding to the g (green) spectrum of an incident light. Accordingly, when only the r(red) and b(blue) spectrums among high frequency spectrums of a spatial frequency which are included in the incident light are reduced, the ratio of W:G:Ye:Cy, the high frequency spectrums of the spatial frequency in signals W, G. Ye and Cy, approaches to 1:1:1:1. In this case, it is possible to reduce moires effectively by making the ratio of WB:GB:YeB:CyB closer to 1:1:1:1. Furthermore, by setting all the amounts of WB, GB, YeB and CyB to an equal amount, a circuit configuration becomes simple, and thereby advantageous from a viewpoint of a circuit scale.

Figure 8:
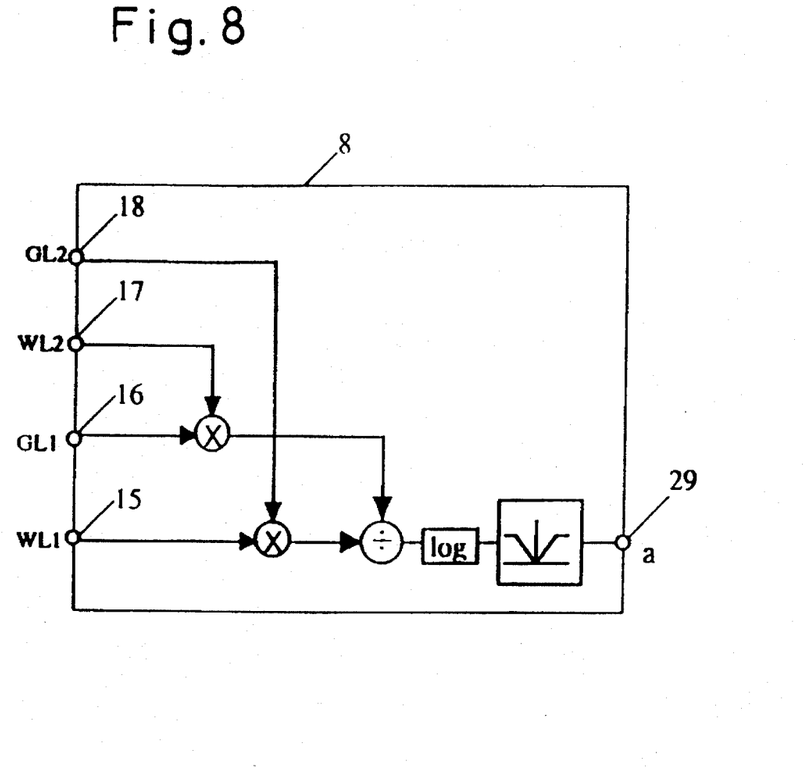
FIG. 8 is a block diagram showing one configuration of a color boundary detection part of FIG. 1.
Figure 9:
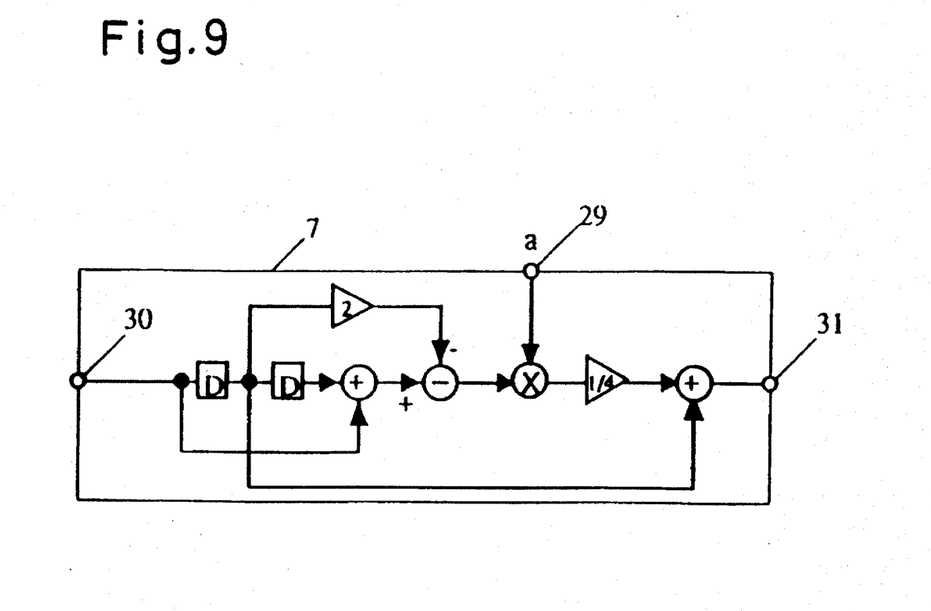
FIG. 9 is a block diagram showing one configuration of a false signal reduction part of FIG. 1.

A false signal at a color boundary can be reduced first by detecting the color boundary and by applying a low-pass filtering operation to a luminance signal at the color boundary. FIGS. 8 and 9 show examples of circuits which reduce false signals occurring from a fluctuation of W:G among the false signals at the color boundary in the vertical direction (in a striping form). A detector 8 can detect the color boundary of W(white) and G(green) by observing a ratio of WL/GL in two adjacent vertical lines. The operation of the example in FIG. 8. is shown in the following formula, which assumes that $W_{L1}$ and $G_{L1}$ are W and G signals processed by one of filters shown in FIGS., 5(e), 5(f), 5(g) and 5(h), and that $W_{L2}$ and $G_{L2}$ are W and G signals processed by one of filters shown in FIGS. 5(i), 5(j), 5(k) and 5(l).

$$\alpha = \log(W_{L1} \times G_{L2})/(G_{L1} \times W_{L2}) \qquad (4)$$

$$a = F(\alpha) \qquad (5)$$

$F(\alpha)$ is a function which changes continually from 0 to 1 and increases as the absolute value of $\alpha$ increases.

When the arrangement of the color separation filters shown in FIG. 2 is used, a false signal appears in the vicinity of the vertical line of 1/2Px in the two-dimensional frequency (1/2Px, 0) at a color boundary in the form of a stripe. Therefore, the false signal can be reduced at the color boundary by applying a filtering operation which reduces signals in the vicinity of the two-dimensional frequency (1/2Px, 0). The filter of FIG. 9 is characterized as follows:

$$H(z)=a\times(z^{+1}-2+z^{-1})/4+1 \quad (6)$$

As mentioned above, FIGS. 8 and 9 show the examples of the circuits which reduce the false signal which appears at the boundary of W(white) and G(green). The same method can be applied to reduce another false signal which appears at the boundary of Ye(yellow) and Cy(cyanogen).

Figure 10:
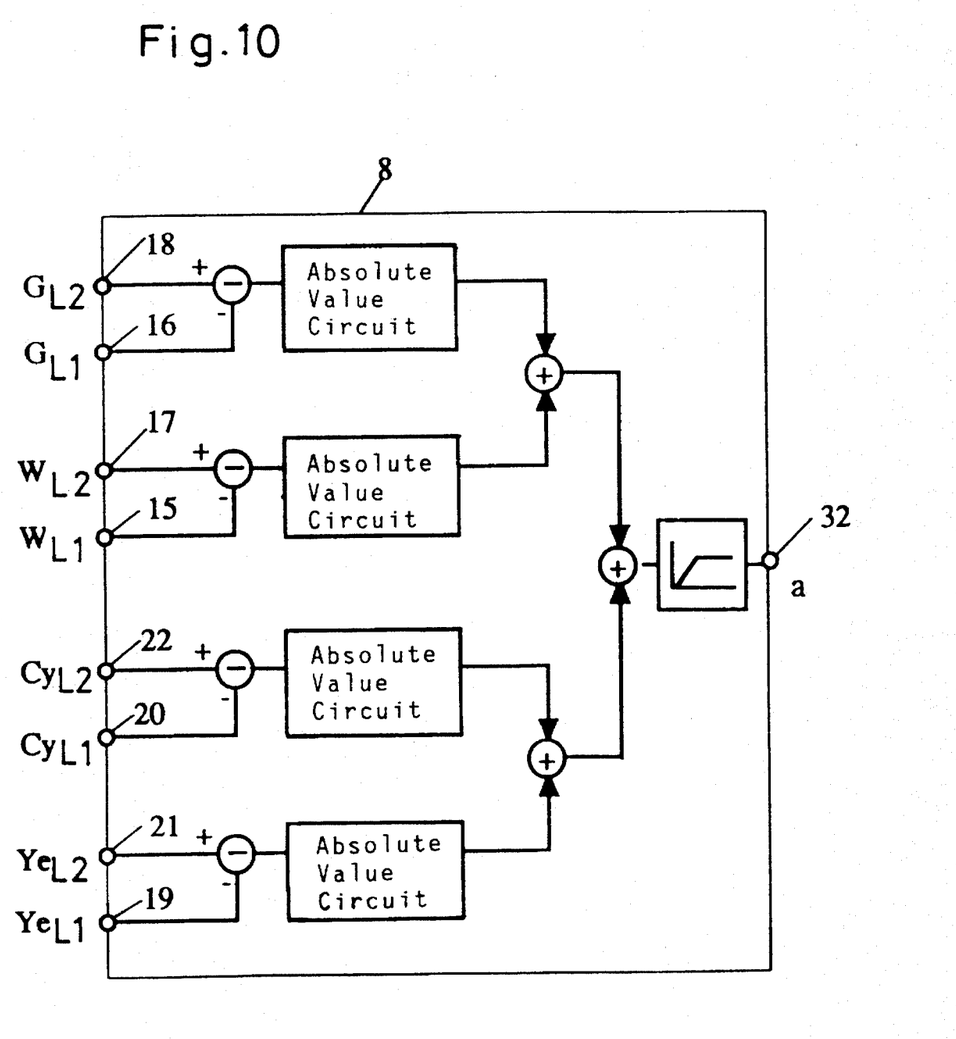
FIG. 10 is a block diagram showing another configuration of a color boundary detecting part of FIG. 1.

FIG. 10 shows another configuration of a circuit to detect the boundary (color changing point) of W(white) and G(green) and Ye(yellow) and Cy(cyanogen) in the vertical direction. The operation of the circuit shown in FIG. 10 is described by the following formula, which assumes that $Ye_{L1}$ and $CY_{L1}$ are Ye and Cy signals processed by one of the filters shown in FIGS. 5(e), 5(f), 5(g) and 5(h), and that $Ye_{L2}$ and $Cy_{L2}$ are Ye and Cy signals processed by one of the filters shown in FIGS. 5(i), 5(j), 5(k) and 5(l).

$$\alpha=|W_{L1}-W_{L2}|+|G_{L1}-G_{L2}|+|Ye_{L1}Ye_{L2}|+|Cy_{L1}-Cy_{L2}| \quad (7)$$

$$a=F(\alpha) \quad (8)$$

The circuit shown in FIG. 10 is effective in its scale since the number of multipliers and dividers are less than those in the circuit of FIG. 8.

An output from the color separation matrix operation part 5 and tile false signal reduction part 7 is output from an output terminal 10 after It is converted into a predetermined signal form at encoder 9.

The invention may be embodied in other specific forms without departing from tile spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A solid state imaging apparatus for reducing moire comprising:

a progressive scan-type imaging element having plurality of pixels arranged in vertical and horizontal directions;

an arrangement of color separation filters having repetition of a minimum unit of color separation filters arranged in a predetermined manner;

means for reading output signals from a plurality of pixels which are positioned in a predetermined area adjoined to each other;

means for obtaining a plurality of low-pass-filtered chrominance signals corresponding to a position of a pixel by using a plurality of said signals from said predetermined adjoined pixels and a first low-pass filter having an arrangement of tap coefficients corresponding to said pixels of said imaging element which are multiplied by said signals from corresponding pixels for reducing chrominance moire;

means for determining ratios of said low-pass-filtered chrominance signals; and means for obtaining a luminance signal of said position by interpolation of said chrominance signals using said ratios of said low-pass-filtered chrominance signals for reducing luminance moire.

2. The solid state imaging apparatus in accordance with claim 1, wherein output signals from said pixels on a plurality of horizontal lines adjoined in the vertical direction are used for operating said chrominance signals corresponding to said positions of said pixels on one horizontal line.

3. The solid state imaging apparatus in accordance with claim 1, further comprising:

a color boundary detection means for detecting a color boundary of two different colors, and a second low-pass-filter for filtering the luminance signal and having an arrangement of tap coefficients, wherein said tap coefficients of said second low-pass-filter change in response to said detection signal of said color boundary detection means.

4. The solid state imaging apparatus in accordance with claim 1, wherein predetermined values are added to output signals from said pixels corresponding to a predetermined color separation filters in said means for obtaining a luminance signal.

5. The solid state imaging apparatus in accordance with claim 4, wherein said predetermined values which are added to said output signals are equal to the ratios of output signals corresponding to said predetermined color separation filters when a white and even luminance object is imaged.

6. The solid state imaging apparatus in accordance with claim 4, wherein said predetermined values which are added to said output signals have a common value.

7. The solid state imaging apparatus in accordance with claim 1, wherein said minimum unit of color separation filters is comprised of two horizontal pixels by four vertical pixels; and said arrangement of said color separation filters comprises a first horizontal line comprised of repetition of white and green, a second horizontal line comprised of repetition of yellow and cyanogen, a third horizontal line comprised of repetition of green and white, and a fourth horizontal line comprised of repetition of cyanogen and yellow.

\* \* \* \* \*